US008780363B2

(12) United States Patent
Omoto et al.

(10) Patent No.: US 8,780,363 B2
(45) Date of Patent: Jul. 15, 2014

(54) METHOD FOR A PRINTING DEVICE THAT PRINTS WHILE COMPENSATING FOR SLIPPAGE AND DEVICE FOR IMPLEMENTING THAT METHOD

(75) Inventors: Satoshi Omoto, Matsumoto (JP); Toshiaki Koike, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 333 days.

(21) Appl. No.: 13/285,287

(22) Filed: Oct. 31, 2011

(65) Prior Publication Data

US 2012/0141185 A1 Jun. 7, 2012

(30) Foreign Application Priority Data

Dec. 2, 2010 (JP) ................................ 2010-269071

(51) Int. Cl.
*G06K 15/00* (2006.01)

(52) U.S. Cl.
USPC .......................... 358/1.12; 358/1.1; 358/1.18

(58) Field of Classification Search
CPC ........... H04N 1/00567; H04N 1/0057; H04N 1/00599; H04N 1/00602; H04N 1/38
USPC ......................... 358/1.1, 1.9, 3.26, 1.12, 1.18
See application file for complete search history.

(56) References Cited

U.S. PATENT DOCUMENTS

| | | | | |
|---|---|---|---|---|
| 5,841,898 | A * | 11/1998 | Liguori | 382/164 |
| 7,317,553 | B2 | 1/2008 | Otsuki | |
| 2007/0223022 | A1 * | 9/2007 | Suzuki | 358/1.12 |

FOREIGN PATENT DOCUMENTS

| | | | |
|---|---|---|---|
| JP | 08-230266 | A | 9/1996 |
| JP | 2000-025288 | A | 1/2000 |
| JP | 2001-341900 | A | 12/2001 |
| JP | 2002-120421 | A | 4/2002 |

* cited by examiner

*Primary Examiner* — Thomas D Lee
(74) *Attorney, Agent, or Firm* — Lowe Hauptman & Ham, LLP

(57) ABSTRACT

A printing device and a control method for a printing device enable eliminating paper feed error due to slipping between a paper feed roller and recording paper when printing. The control unit of a thermal printer has a slippage calculator that runs a process to calculate slippage between the recording paper and platen roller when conveying the recording paper during printing, and a conveyance distance correction unit that runs a process to correct the paper feed distance of the recording paper when printing to each printing area based on the slippage that was just calculated. The conveyance distance correction unit runs a process that inserts a non-printing area d of a length corresponding to the slippage to one or plural specific positions in the original print image.

15 Claims, 4 Drawing Sheets

METHOD FOR A PRINTING DEVICE THAT PRINTS WHILE COMPENSATING FOR SLIPPAGE AND DEVICE FOR IMPLEMENTING THAT METHOD

This application claims priority under 35 U.S.C. §119 to Japanese Patent Application No. 2010-269071 filed on Dec. 2, 2010, the entire disclosure of which is expressly incorporated by reference herein.

BACKGROUND

1. Technical Field

The present invention relates to a printing device and a control method therefor, and relates more particularly to a printing device having a recording paper conveyance mechanism that conveys recording paper, and to a control method for the printing device.

2. Related Art

Printers having a friction-feed recording paper conveyance mechanism that causes a paper feed roller pressed against the recording paper to rotate, and conveys the recording paper only the distance corresponding to how far the feed roller turns, are known from the literature. This type of printer can form lines of printed characters and lines of printed images at a specific printing pitch in the conveyance direction of the recording paper by executing a printing operation by a printhead synchronized to the recording paper conveyance operation of the recording paper conveyance mechanism.

Such printers detect rotation of the paper feed roller or rotation of the motor used as the rotational drive source of the paper feed roller by an encoder, and control how much the recording paper is conveyed based on the detected rotation. However, while rotation of the paper feed roller can track the feed distance of the recording paper with good precision when there is no slipping between the surface of the paper feed roller and the recording paper, when the paper feed roller wears and slipping between the paper and paper feed roller occurs, the paper feed distance is reduced by the amount of slippage.

More particularly, when conveying label paper having labels affixed to the surface of a liner, the shoulders of the labels on the label side of the paper tend to increase the friction load with the printhead while the friction load tends to drop on the back side of the liner that contacts the paper feed roller because the liner is treated to prevent the label adhesive from sticking thereto, and slipping between the label paper and paper feed roller occurs easily. Therefore, when recording paper conveyance is controlled based only on the rotation of the paper feed roller or the motor, the actual feed distance is shorter than the set paper feed distance by the amount of slippage, and paper feed cannot be controlled with good precision. As a result, lines of printed text and lines of printed pixels are formed at a pitch that is narrower than intended in the conveyance direction. Because printing at the correct position is not possible when the printing pitch shifts, print quality drops and the printed information may not be readable, for example.

Japanese Unexamined Patent Appl. Pub. JP-A-H08-230266 describes a printer that prints to the surface of a continuous web having adhesive tape affixed to a release paper liner while conveying the web by a feed roller. This printer measures the printout and calculates slippage (the paper feed deficiency caused by slipping), and based on this calculated slippage sets a pitch correction value for the web being printed on. More specifically, the set print length is compared with the measured length of the printout, and the difference therebetween is stored as correction data. The printer then compensates for this slippage in the next printing operation by adding the number of steps corresponding to the correction data (that is, the slippage) to the drive step count of the drive motor that conveys the tape only the print length.

With the compensation method described in JP-A-H08-230266, the user manually sets and configures the correction data. The calculated correction data is stored in memory disposed to a cassette that holds the tape. As a result, once the correction data is stored in memory, compensation based on this correction data is enabled by simply installing the tape cassette.

However, this method of manually calculating and storing correction data in memory in each tape cassette means that the correction data must be set individually for each tape cassette. In addition, in order to always compensate accurately for slippage, even when slippage changes as a result of conveyance mechanism wear, this correction operation must be performed and the correction data updated frequently. The burden on the user is therefore great.

The correction method taught in JP-A-H08-230266 also adjusts the conveyance distance in the drive step units of the drive motor. This means that the paper feed distance correction unit may be greater than the actual amount of slippage when slippage is slight, and the paper feed distance cannot be accurately corrected. The problem in this case is a drop in print quality. More specifically, barcodes and other objects requiring high precision printing cannot be printed with the required precision, and read errors can result from the printed barcodes.

SUMMARY

A printing device and a control method therefor according to the invention eliminate conveyance errors caused by slipping between the paper feed roller and recording paper, and enable high precision printing.

A first aspect of the invention is a control method for a printing device that is connectable to a computer and prints to recording paper by a printhead based on print data received from the computer while conveying the recording paper by a paper feed roller, including steps of: determining slippage between the paper feed roller and the recording paper when conveying the recording paper through a specific print area on the recording paper; and compensating for slippage when conveying the next print area located downstream from the specific print area in the conveyance direction of the recording paper by inserting a non-printing area of a length corresponding to the slippage in white space where printing by the printhead based on the print data does not occur in the next print area.

When conveying a particular print area while printing to the print areas of the recording paper, this aspect of the invention can perform a conveyance correction process that automatically reflects in the next print area the deficiency (slippage) of the conveyance distance during media conveyance in the previous printing operation (when printing to a specific print area). As a result, state changes such as slipping by the recording paper conveyance mechanism can be quickly fed back, slipping can be constantly optimally corrected, and paper feed errors can be eliminated. Because the amount of slipping tends to change gradually instead of changing suddenly before and after the print area, slipping can be suitably corrected based on the slippage in the immediately preceding print area. In addition, because white space in which the printhead does not print is found and a non-printing area is inserted thereto, there is no affect on the image parts formed by the printhead. Deviation between the actual conveyance distance of the recording paper and the conveyance distance specified in the print data can therefore be suppressed, and a drop in print quality can be suppressed effectively. High print quality can therefore be maintained in barcodes and other printout that require high precision, and a drop in barcode readability can be suppressed. High print quality can also be maintained without burdening the user because manual correction by the user is not needed.

More particularly, when label paper having labels affixed to the surface of a liner is conveyed while held between a paper feed roller and printhead such as a line thermal head at an opposing position, the friction load between the surface to which the labels are applied and the printhead tends to increase due to the thickness difference at the label edge while the friction load on the back side of the liner that contacts the paper feed roller tends to decrease due to the surface coating that resists adhesion of the label adhesive thereto, and slipping between the print medium and the paper feed roller occurs easily. The printing device according to this aspect of the invention is particularly effective when conveying this type of label paper.

A control method according to another aspect of the invention preferably also includes a step of: compensating for slippage when there are multiple white spaces in the next print area by dividing and inserting the non-printing area into a specified number of white spaces.

Because this aspect of the invention can automatically increase the target conveyance distance (paper feed roller drive distance) of the recording paper in the next printing process by a length corresponding to the slippage, the conveyance distance deficiency can be eliminated by this increase by the time printing is completed, and printing can be completed after conveying the recording paper the amount specified in the print data. Therefore, when print areas are formed at a constant pitch in the conveyance direction on continuous recording paper, the conveyance distance shortage can be reliably eliminated before starting to print the next print area, and the recording paper can be reliably positioned to the beginning of the next print area. In addition, because non-printing areas can be suitably inserted in segments, the effect on the printout can be reduced and a drop in print quality can be suppressed.

A control method according to another aspect of the invention preferably also has steps of dividing the next print area into plural segments at a specific interval in the conveyance direction of the recording paper; determining if each divided segment is a white space; segmenting and inserting the non-printing area to a specific plural number of white spaces or to one specific white space if there are plural white spaces; and inserting the non-printing area to that white space if there is only one white space.

If non-printing areas are inserted to segments of the print image containing white space where print dots are not formed, the overall length of the print image can be increased to correct for slippage without affecting the parts of the image formed by print dots in the print image. Print quality will therefore not be impaired as a result of inserting non-printing areas and creating white lines (white space) in the middle of images in the print image. In addition, when the print image is segmented into numerous parts at a narrow interval, numerous locations (white spaces) where non-printing areas can be inserted can be set. Because the non-printing area can thus be segmented and inserted in numerous parts, the effect on the printout can be minimized. A drop in print quality can therefore be suppressed. When a non-printing area is inserted in one place, the process can be accelerated.

A control method according to another aspect of the invention further preferably also has steps of determining the insertion length of the non-printing area to the next print area based on the slippage; calculating a unit insertion length as the insertion length divided by the number of segments in the next print area; sequentially determining from the end of the next print area on the upstream side in the conveyance direction whether or not each segment is white space; and when a segment is determined to be white space and the non-printing area is segmented and inserted therein, setting the insertion length of the non-printing area to the white space to the unit insertion length if the white space is located at the beginning of the print area or the segment immediately preceding the white space is white space to which the non-printing area is inserted, and setting the insertion length of the non-printing area to the white space to the sum (n+1) of the unit insertion length plus the product of the unit insertion length times the number of consecutive non-white-space segments (n) immediately preceding the white space segment if the segment immediately preceding the white space is not white space and a non-printing area is not inserted thereto.

When non-printing areas are thus inserted in segments, non-printing areas of a unit length are in principle inserted to white space at specific intervals, and non-printing areas are not inserted where there is no white space. As a result, the insertion length can be accumulated in unit length increments, and inserted at once in the next white space. By thus segmenting the non-printing area, the cumulative insertion length of the non-printing area increases substantially linearly from the beginning to the end of the print image. Concentration of the non-printing areas in one place can therefore be prevented, and the effect on the printout is minimal. A drop in print quality can therefore be suppressed.

In another aspect of the invention, when a print image based on print data received from a computer is placed using coordinates in the next print area, the coordinates that position the print objects constituting the print image in the print area are converted in the conveyance direction based at least on the slippage.

Further alternatively, the next print area may be defined as an area of a page unit, and the coordinates may indicate a position on the page.

Data defining an area in the page range, print objects, and data for coordinates positioning the print objects are contained in the print data, and the print objects can be placed using the coordinates in the space of a page of a defined area.

In another aspect of the invention, when continuous paper having print areas disposed at a constant interval in the conveyance direction, or label paper having labels defining the print areas affixed at a constant interval in the conveyance direction on a continuous liner, is used as the recording paper, the control method preferably includes as steps executed when printing to each print area: detecting a reference position for a print area on the recording paper at a specific position on the conveyance path while conveying the recording paper, and acquiring the rotational distance of the paper feed roller or the drive distance of the paper feed roller drive source during the time between detection of one reference position and detection of the reference position corresponding to the next print area; and calculating the slippage based on the detected rotational distance or drive distance, and the previously stored interval between the print areas.

Based on a period corresponding to detection of the reference positions, the rotational distance of the paper feed roller required to convey the recording paper only the length between the print areas corresponds to the conveyance distance when slipping occurs. More than the usual amount of time is required to detect the reference positions when slipping occurs even though the paper feed roller is turning. The conveyance distance when the paper feed roller rotates more than the specified amount corresponds to the slippage. Slippage can therefore be automatically calculated based on this rotational distance or the drive amount corresponding thereto, and the previously stored specified interval between print areas when slipping does not occur.

Further preferably, the reference position is a mark corresponding to each print area applied to the recording paper, or is a label edge.

Because the marks and label edges can be detected by an optical sensor, the recording paper conveyance position can be detected using an optical sensor such as used in the related art. Slippage can therefore be calculated by detecting media passage using these types of sensors.

The control method for a printing device according to another aspect of the invention also has steps of: storing slippage between the paper feed roller and the recording paper in the specific print areas; and inserting a non-printing area of a length corresponding to the stored slippage to compensate for slipping when conveying the next print area.

Because slippage when printing the previous print area is stored when printer power turns off, the stored slippage can be read and used for paper feed correction when printing the next print area after the power turns on again.

Another aspect of the invention is a control method for a printing device that is connectable to a computer and prints to recording paper by a printhead based on print data received from the computer while conveying the recording paper by a paper feed roller, including steps of: determining slippage between the paper feed roller and the recording paper when conveying the recording paper through a specific print area on the recording paper; and converting coordinates in the conveyance direction based on the slippage when conveying the next print area to a position downstream from the specific print area in the conveyance direction of the recording paper when print objects are placed in the next print area using coordinates based on print data received from the computer.

For example, the coordinates can be converted based on the original size of the print image and the shrinkage caused by slipping in the conveyance direction of the print image. The print objects after coordinate conversion can therefore be printed at the printing position intended in the original print image regardless of slipping while printing. The original print image can therefore be printed as intended. Printing with good print quality is therefore possible even if slipping occurs.

In another aspect of the invention, the next print area is defined as a page of a specific range, and the coordinates identify a position on the page.

Slipping can therefore be desirably corrected when printing in specific page units in a so-called page mode.

Another aspect of the invention is a printing device that is connectable to a computer, including: a communication unit that receives print data from the computer; a recording paper conveyance mechanism including a paper feed roller that conveys recording paper through a conveyance path and a drive source that drives the paper feed roller; a printhead that prints on the recording paper; a slippage calculation unit that calculates slippage between the paper feed roller and the recording paper that occurs when conveying the recording paper through a specific print area on the recording paper; and a conveyance distance correction unit that compensates for slippage when conveying the next print area located downstream from the specific print area in the conveyance direction of the recording paper by inserting a non-printing area of a length corresponding to the slippage in white space where printing by the printhead based on the print data does not occur in the next print area.

In a printing device according to another aspect of the invention, the conveyance distance correction unit preferably compensates for slippage when there are multiple white spaces in the next print area by dividing and inserting the non-printing area into a specified number of white spaces.

In a printing device according to another aspect of the invention, the conveyance distance correction unit preferably divides the next print area into plural segments at a specific interval in the conveyance direction of the recording paper, determines if each divided segment is a white space, segments and inserts the non-printing area to a specific plural number of white spaces or to one specific white space if there are plural white spaces, and inserts the non-printing area to that white space if there is only one white space.

In a printing device according to another aspect of the invention, the conveyance distance correction unit preferably determines the insertion length of the non-printing area to the next print area based on the slippage; calculates a unit insertion length as the insertion length divided by the number of segments in the next print area; sequentially determines from the end of the next print area on the upstream side in the conveyance direction whether or not each segment is white space; and when a segment is determined to be white space and the non-printing area is segmented and inserted therein, sets the insertion length of the non-printing area to the white space to the unit insertion length if the white space is located at the beginning of the print area or the segment immediately preceding the white space is white space to which the non-printing area is inserted, and sets the insertion length of the non-printing area to the white space to the sum of the unit insertion length plus the product of the unit insertion length times the number of consecutive non-white-space segments immediately preceding the white space segment if the segment immediately preceding the white space is not white space and a non-printing area is not inserted thereto.

A printing device according to another aspect of the invention preferably also has a detector that detects a reference position denoting a print area on the recording paper at a specific position on the conveyance path; wherein the recording paper is continuous paper having print areas disposed at a constant interval in the conveyance direction, or is label paper having labels defining the print areas affixed at a constant interval in the conveyance direction on a continuous liner; the detector detects the reference position while the paper feed roller conveys the recording paper when printing to each print area by the printhead; and the slippage calculation unit acquires the rotational distance of the paper feed roller or the drive distance of the paper feed roller drive source from the time when the detector detects the reference position of the specific print area to the time when the detector detects the reference position of the next print area, and calculates the slippage based on the detected rotational distance or drive distance, and the previously stored interval between the print areas.

Further preferably in another aspect of the invention, the reference position is a mark corresponding to each print area applied to the recording paper, or is a label edge.

Further preferably, a printing device according to another aspect of the invention also has a storage unit that stores slippage between the paper feed roller and the recording paper in the specific print areas; wherein the conveyance distance correction unit inserts a non-printing area of a length corresponding to the slippage stored in the storage unit to compensate for slipping when conveying the next print area.

In a printing device according to another aspect of the invention, the storage unit preferably stores a print object that is based on print data received from the computer and corresponds to the next print area at a specific position using coordinates; and the conveyance distance correction unit converts coordinates of the print object stored in the storage unit based on the slippage.

Yet further preferably, the print object is stored in a page of a specific area set in the storage unit.

EFFECT OF THE INVENTION

When conveying a particular print area,

The invention can perform a conveyance process that automatically reflects in each print area the deficiency (slippage) of the conveyance distance during media conveyance in the previous printing operation. As a result, state changes such as slipping by the recording paper conveyance mechanism can be quickly fed back, and slipping can be optimally corrected. Deviation between the actual conveyance distance of the recording paper and the conveyance distance specified in the print data can therefore be suppressed, and a drop in print quality can be suppressed effectively. High print quality can also be maintained without burdening the user because manual correction by the user is not needed.

Other objects and attainments together with a fuller understanding of the invention will become apparent and appreciated by referring to the following description and claims taken in conjunction with the accompanying drawings.

DESCRIPTION OF EMBODIMENTS

Printing Device

Figure 1:
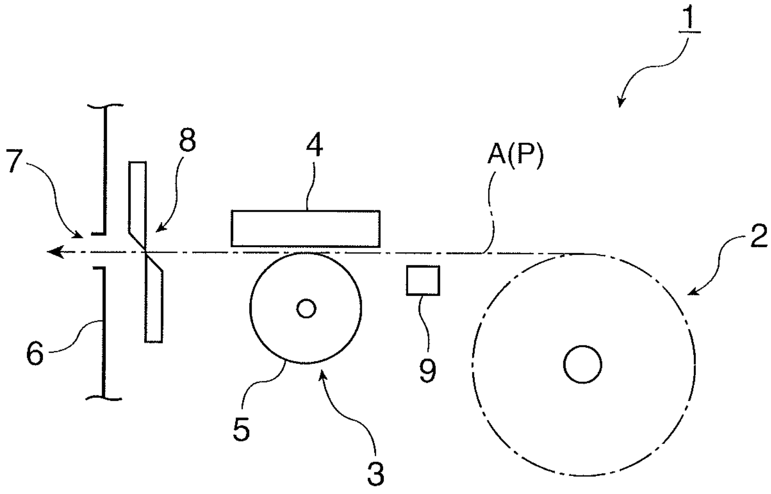
FIG. 1 describes the basic configuration of the main parts of a thermal printer according to a preferred embodiment of the invention.

Preferred embodiments of the present invention are described below with reference to the accompanying figures. FIG. 1 schematically describes the configuration of main parts of a thermal printer according to a preferred embodiment of the invention. The thermal printer 1 (printing device) includes a roll paper compartment 2 for storing recording paper composed of a web of recording paper P wound into a roll; a recording paper conveyance mechanism 3 that conveys the recording paper P delivered from the paper roll in the roll paper compartment 2 through a conveyance path A inside the printer; and a thermal head 4 (printhead) disposed with the heating part thereof facing the printing position B on the conveyance path A.

Figure 2:
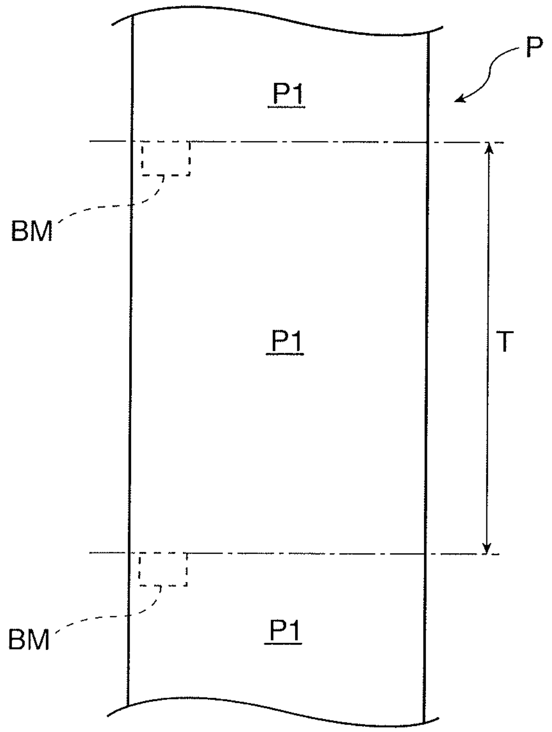
FIG. 2 is a plan view of recording paper.

FIG. 2 is a plan view of the recording paper P. This embodiment of the invention uses continuous paper as the recording paper P, and has a heat-sensitive coating applied to the surface of the recording paper P. Black marks BM (marks) are formed at a constant interval along the length (conveyance direction) of the recording paper Pon the back side of the recording paper P. The area from one black mark BM to the next black mark BM is one printing area P1. More specifically, the printing areas P1 are arranged in one line at a constant pitch T on the front side of the recording paper P, and the black mark BM disposed to the leading end of each printing area P1 is used as a positioning mark denoting the beginning (reference position) of each printing area P1.

As shown in FIG. 1, the recording paper conveyance mechanism 3 includes a platen roller 5 (conveyance roller) disposed opposite the thermal head 4, and a conveyance motor 5*a* (see FIG. 3) that drives the platen roller 5. The recording paper P delivered from the paper roll is loaded so that it passes between the thermal head 4 and platen roller 5, and the recording paper P is conveyed in conjunction with rotation of the platen roller 5 in contact with the recording paper P. A plurality of heat elements are disposed in a row widthwise to the recording paper P at the part of the thermal head 4 opposite the platen roller 5. When the heat elements are in contact with the surface of the recording paper P held between the thermal head 4 and the platen roller 5, and a specific voltage causing the heat elements to emit heat is applied to individual heat elements, the parts of the thermal coating on the recording paper P in contact with the heat elements change color and a print dot is formed on the surface of the recording paper P.

By driving the thermal head 4 synchronized to paper conveyance by the platen roller 5, rows of printed dots are formed sequentially on the surface of the recording paper P passing the printing position B, and printing is performed. The downstream end of the conveyance path A extends to the paper exit 7 disposed in the printer case 6 of the thermal printer 1. An automatic cutter 8 for cutting the recording paper is disposed near the paper exit 7. The printed portion of the recording paper is issued by stopping paper feed with the printed printing area P1 discharged to the outside of the paper exit 7, and then cutting the recording paper P with the automatic cutter 8.

A printer for detecting the paper feed position of the recording paper P is disposed to the conveyance path A on the upstream side of the printing position B. The paper detector 9 is a reflective photosensor including an emitter disposed opposite the back side of the recording paper P on the conveyance path A, and a photodetector for detecting the light reflected from the backside of the recording paper P. Passage of a black mark BM can be detected based on change in the output of the photodetector when a black mark BM on the back side of the recording paper P passes the detection position C of the paper detector 9.

Control System

Figure 3:
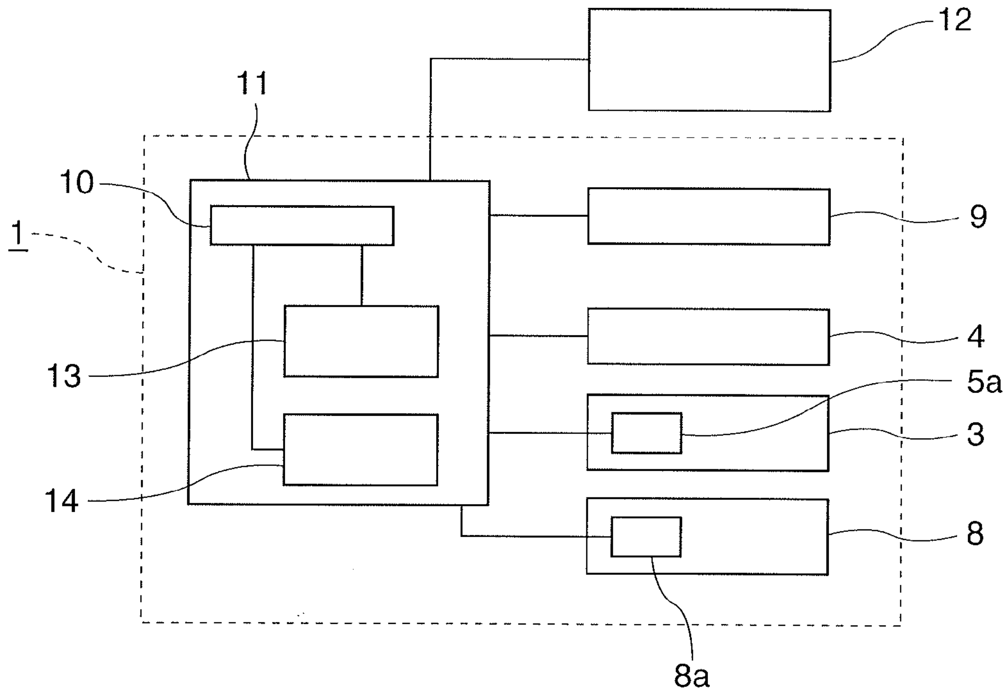
FIG. 3 is a schematic block diagram showing the control system of the thermal printer.

FIG. 3 is a block diagram of the control system of the thermal printer 1. The control system of the thermal printer 1 is built around a control unit 11 including a CPU and a storage unit 10 such as ROM or RAM. Values used for control and a control program, for example, can be stored in the storage unit 10. On the output side of the control unit 11 are connected the thermal head 4 through a head driver not shown, and the conveyance motor 5*a* of the recording paper conveyance mechanism 3 through a motor driver not shown. The cutter motor 8*a* of the automatic cutter 8 is also connected through a motor driver not shown. To the input side of the control unit 11 are connected the paper detector 9 described above, and a host device 12 connected through a communication line, for example.

The control unit 11 runs a control program stored in ROM based on print data and commands received from the host device 12, and controls driving parts of the thermal printer 1 to execute recording paper P conveyance and positioning operations and printing operations. In the recording paper P conveyance and positioning operation, the control unit 11 controls conveyance of the recording paper P by the platen roller 5 driven by the conveyance motor 5*a* through the motor driver. During this time the control unit 11 counts the drive distance by counting, for example, how many steps the conveyance motor 5*a* is driven (the drive step count) or the output rotation, determines the rotation of the platen roller 5 based on this count, and controls the recording paper P conveyance distance. When printing on the recording paper P, the control unit 11 controls conveying the recording paper P while driving the thermal head 4 through the head driver, and forms a print image, which is a collection of print dots on the surface of the recording paper P, according to the print data supplied from the host device 12 side. The control unit 11 also controls driving the cutter motor 8*a* through the motor driver, and cuts the recording paper P by the automatic cutter 8.

The control unit 11 monitors change in the output of the photodetector of the paper detector 9 during conveyance of the recording paper P by the recording paper conveyance mechanism 3, and detects when a black mark BM passes the detection position C on the conveyance path A. The control unit 11 also determines the paper feed position of the recording paper P based on the timing when passage of the black mark BM is detected and the drive step count or rotational distance count of the conveyance motor 5*a* described above. As a result, a desired part of the recording paper P can be positioned to the printing position B.

The control unit 11 has a slippage calculator 13 that runs a process to calculate the slippage L (see FIG. 4) between the recording paper P and the platen roller 5 during conveyance of the recording paper P while printing. The slippage calculator 13 starts counting the drive step count or rotational distance of the conveyance motor 5*a* when passage of one black mark BM is detected based on output from the paper detector 9, and captures the cumulative count at the time passage of the next black mark BM is detected. The slippage calculator 13 then calculates the product (actual conveyance distance) of this count multiplied by the theoretical recording paper P conveyance distance (unit conveyance distance) per unit step count or unit rotational distance when there is absolutely no slipping. The difference of this product minus the pitch T between the black marks BM is slippage L. The slippage calculator 13 calculates the slippage L while printing to the printing area P1 between these two black marks BM by reading the pitch T value previously stored in the storage unit 10.

Alternatively, the rotational distance may be calculated by using a rotary encoder to determine the rotational distance of the platen roller 5 directly instead of determining how far the conveyance motor 5*a* is driven. Further alternatively, instead of using a previously stored pitch T value, the conveyance distance target (such as the conveyance motor 5*a* drive setting) specified in the print data could be compared with the actual total drive distance or the actual conveyance distance calculated from this total to calculate the slippage L.

The calculated slippage L is stored in the storage unit 10, and read and used to correct the next print area. Because the slippage L is stored in the storage unit 10 even when the thermal printer 1 power is off, it can be read and used to correct the next print area after the power turns on again.

The control unit 11 also has a conveyance distance correction unit 14 that runs a process based on the calculated slippage L to correct recording paper P conveyance when printing to each printing area P1 based on the print data. When slipping occurs and paper feed is controlled as specified by the print data when printing to each printing area P1, the paper feed distance will be short by the amount of slippage L. Because of this, the conveyance distance correction unit 14 in this embodiment of the invention changes the content of the printing process to increase the recording paper P conveyance distance set in the print data for each printing area P1 by an amount equal to the slippage L that was just calculated. As a result, the increase (correction) of the conveyance distance and the slippage L cancel each other out during printing, and as a result eliminate the difference between the actual conveyance distance and the conveyance distance specified in the original print data. Correction methods used by the conveyance distance correction unit 14 are described next.

Figure 4A:
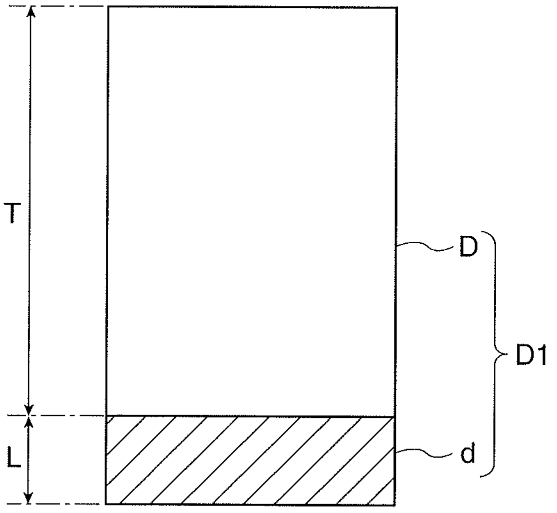
FIG. 4 describes the media conveyance correction method.
Figure 4B:
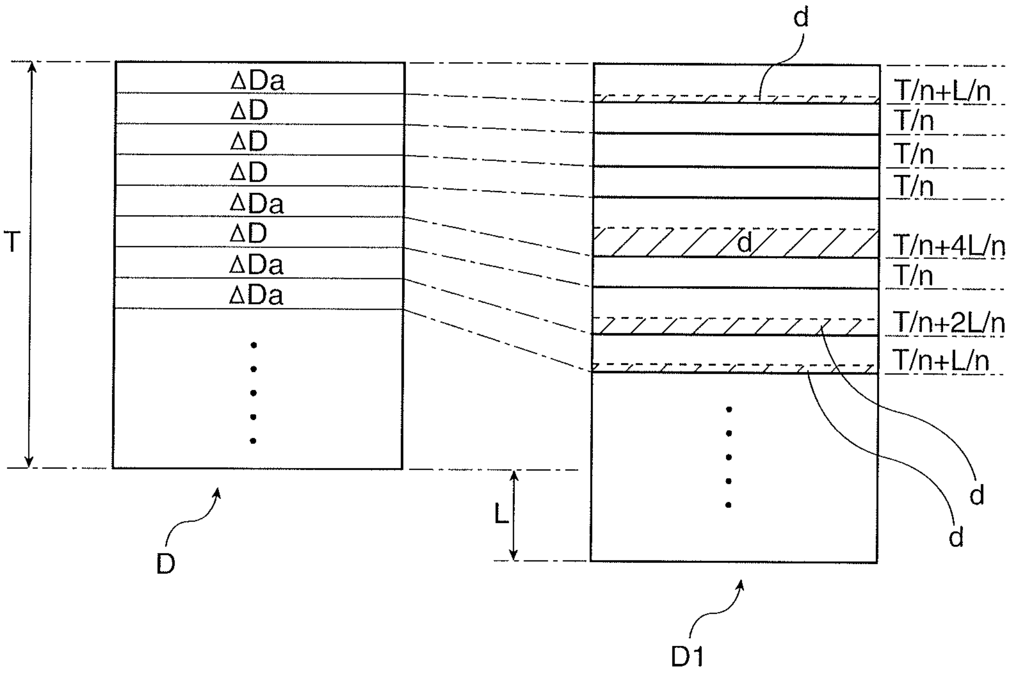

Correcting the Conveyance Distance by Inserting a Non-Printing Area Sized According to the Slippage FIG. 4 describes a method of correcting the conveyance distance, FIG. 4A showing a correction method that inserts a single non-printing area and FIG. 4B showing a correction method that inserts a non-printing area divided into segments. Note that these correction methods are premised on first performing a process whereby the slippage calculator 13 calculates the slippage L when printing to each printing area P1, and the calculated value being stored and held in the storage unit 10. The stored slippage L value is updated for the next printing operation each time a new slippage L value is calculated.

Correction by Inserting a Non-Printing Area in One Place

As shown in FIG. 4A, after the original print image D to be printed in the printing area P1 is written to the image buffer according to the content specified in the print data, the conveyance distance correction unit 14 in this correction method inserts a non-printing area d of the same length as the slippage L (the slippage L read from the storage unit 10) calculated in the previous printing operation at the trailing end of the print image D. The trailing end of this print image D is an area to which the thermal head 4 does not print, and insertion of this non-printing area d does not affect output of the print image D. The thermal printer 1 is also controlled so that the corrected print image D1 is printed from the beginning of the printing area P1.

This results in the conveyance distance of the recording paper P from the start to the end of printing to printing area P1 being the length of the conveyance distance specified in the original print data plus the slippage L. However, the length that the recording paper P is actually conveyed while printing is the slippage L shorter than the set conveyance distance, and as a result the recording paper P can be conveyed only the distance specified in the original print data. As a result, the paper feed error resulting from slipping can be eliminated by the time printing ends, and the next printing operation can be started immediately.

The insertion position of the non-printing area d is set to the trailing end of the print image D in the example shown in FIG. 4A, but the non-printing area d could be inserted to a different position. For example, if a footer is located at the trailing end of the print image D, the non-printing area d could be inserted before the footer. This enables eliminating the printing position of the footer being shifted due to slipping. Alternatively, if a header is at the leading end of the print image and is followed by text or an image, inserting the non-printing area d between the header and the text or image is also conceivable. Inserting a single non-printing area d to specific positions based on other scenarios is also possible. If label paper is used as the recording paper P as described below, the non-printing area d could also be inserted to a position on the liner between one label and the next label.

Correction by Inserting a Non-Printing Area Segmented into Parts

After the original print image D to be printed in the printing area P1 is written to the image buffer according to the content specified in the print data, the conveyance distance correction unit 14 in the correction method shown in FIG. 4B divides the print image D into segments at a specific pitch from beginning to end. As a result, the original print image D is divided into numerous segments ΔD of the same length. The conveyance distance correction unit then determines if print dots (print elements) are located in each of the segments ΔD, and detects any white spaces ΔDa, which are empty segments ΔD in which no print dots are formed. A non-printing area d is inserted to each detected white space ΔDa. For example, if the original print image D is a text document, the print image D is segmented into line pitch units, and a non-printing area d is inserted to the blanks between lines. White space between characters in the line direction may also be used.

In FIG. 4B numerous white spaces ΔDa are detected, and the non-printing area d is segmented and distributed to each of these white spaces ΔDa. The conveyance distance correction unit 14 inserts the non-printing areas d using the method described below. The conveyance distance correction unit 14 first calculates unit insertion amount L/n, which is the slippage L divided by the number n of segments ΔD. Next, proceeding sequentially from the beginning of the printing area P1, whether or not each segment ΔD is a white space ΔDa is determined. If the first segment ΔD is a white space ΔDa, a non-printing area d with a length of unit insertion amount L/n is inserted to the white space ΔDa. This increases the length of the white space ΔDa by unit insertion amount L/n, and shifts the next segment ΔD downstream by unit insertion amount L/n.

If the first segment ΔD is not a white space ΔDa, this segment ΔD is printed according to the print data, and the next segment ΔD is then evaluated. This evaluation repeats until a white space ΔDa is found, and each segment ΔD that is not white space ΔDa is printed as is. When a white space ΔDa is found, the length equal to the unit insertion amount L/n times the number of immediately preceding consecutive segments ΔD that are not white spaces ΔDa is calculated, and a non-printing area d of a length equal to this product plus the unit insertion amount L/n is inserted.

If the segment ΔD immediately after the white space ΔDa is another white space ΔDa, a non-printing area d with a length of unit insertion amount L/n is inserted to that next white space ΔDa.

If the white space ΔDa is immediately followed by one or a specific number of consecutive segments ΔD that are in turn followed by a white space ΔDa, the length equal to the unit insertion amount L/n multiplied by the number of consecutive segments ΔD that are not white space ΔDa immediately before the next detected white space ΔDa is calculated as described above, and a non-printing area d with a length equal to this product plus the unit insertion amount L/n is inserted.

More specifically, this insertion method in principle inserts a non-printing area d with a length of unit insertion amount L/n when a white space ΔDa is detected. However, if a white space ΔDa is not found, the insertion length of the non-printing area d accumulates in unit insertion amount L/n increments until a white space ΔDa is detected, inserting a non-printing area d is delayed until a white space ΔDa is found, and when a white space ΔDa is found, a non-printing area d with a length equal to this cumulative total plus the unit insertion amount L/n is inserted. As a result, the cumulative insertion length of the non-printing area d basically increases at a constant growth rate from the beginning to the end of the printing area P1. As a result, non-printing areas d can be appropriately distributed and inserted in the print image without affecting the print dot groups. The length of the print image can therefore be increased by the amount of slippage L, and conveyance error can be eliminated. White lines, for example, are also not produced in the print image, and a drop in print quality can be suppressed. Furthermore, because narrow non-printing areas d can be inserted distributed throughout the print image when the number of segments is increased, there is little effect on the printout and a good appearance can be achieved. Note also that a configuration that inserts a non-printing area d to only some white spaces ΔDa is also conceivable.

Conveyance Distance Correction that Converts the Coordinates of Print Elements According to Slippage FIG. 5 describes another method of correcting the paper feed distance. This correction method is also premised on updating the slippage L used for correction each time printing to a printing area P1. When writing a print image based on the print data to the image buffer, this correction method sets coordinates that are a reference point for printing by text, image, or other print object unit, places each print object in the printing area P1 based on the set coordinates, and writes the print image to memory. The image buffer is thus configured as a page defined by coordinates, and the conversion mode that writes the print objects on each page by specifying the object coordinates is called a page mode. In contrast, the mode that builds a print image in line units as shown in FIG. 4 is called the normal mode.

Figures 5A, 5B:
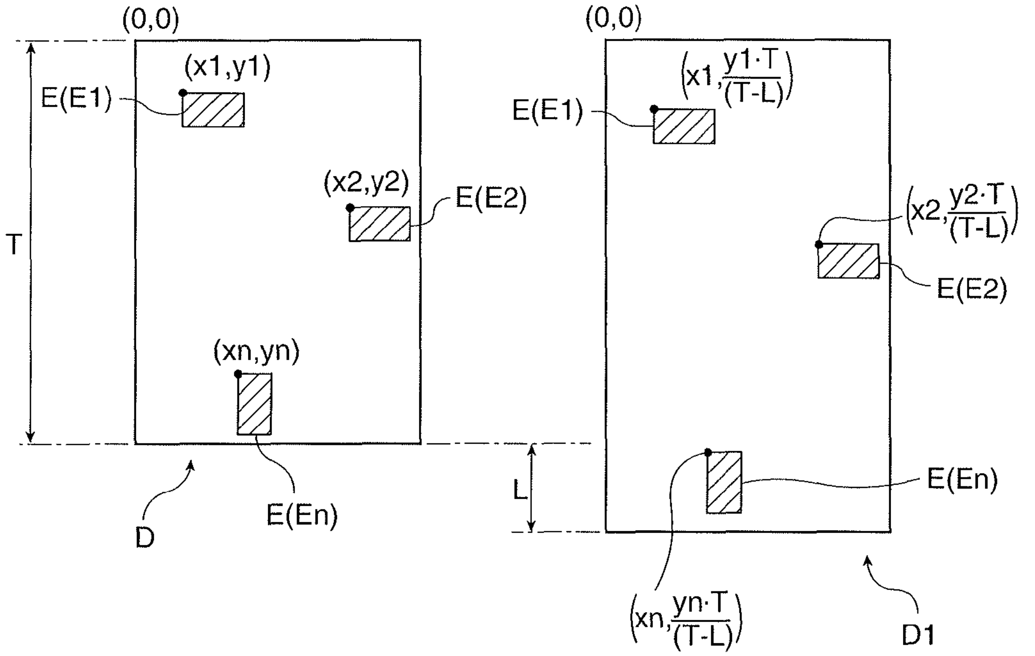
FIG. 5 describes another example of the media conveyance correction method.

FIG. 5A describes writing a print image D according to the original print data, and FIG. 5B describes writing a corrected print image D1. As shown in FIG. 5A, the print objects E (E1, E2, . . . En) rendering the original print image D are placed at the print coordinates (x1, y1), (x2, y2) . . . (xn, yn) specified in the print data. However, when this print image D is printed as specified without correction, the actual printout will be shortened overall by the length of the slippage L. When this happens, the actual print coordinates of each print object E move to coordinate positions corresponding to the shrinkage of the printout in the recording paper conveyance direction due to slipping. This shrinkage of the printout in the recording paper conveyance direction can be calculated as (T−L)/T based on the pitch T of the printing areas P1 and slippage. More specifically, the actual print coordinates of each print object E become (x1, y1×(T−L)/T), (x2, y2×(T−L)/T), . . . (xn, yn×(T−L)/T).

Therefore, when the print image shrinks due to slipping, the conveyance distance correction unit 14 corrects the print coordinates of each print object E to match the original coordinates (x1, y1), (x2, y2), . . . (xn, yn). As a result, as shown in FIG. 5B, the y-coordinates of the corrected print coordinates (that is, the coordinates in the recording paper conveyance direction) are corrected by a multiple of the reciprocal of shrinkage. The corrected coordinates become (x1, y1×T/(T−L)), (x2, y2×T/(T−L)), . . . (xn, yn×T/(T−L)). Due to slipping, this enables printing each of the print objects E in the printout at the position specified in the original print data. As a result, the original print image can be printed as intended. High precision printing is therefore possible even when slipping occurs.

Because the correction methods described above can thus execute a printing process that corrects the recording paper P conveyance distance based on slippage L (the deficiency in the conveyance distance) during the previous printing operation, state changes such as wear of the platen roller 5 in the recording paper conveyance mechanism 3 can be quickly fed back and optimal slip correction can always be applied. Deviation between the actual conveyance distance of the recording paper P and the conveyance distance specified in the print data can therefore be suppressed, and a drop in print quality can be effectively suppressed. In addition, because manual correction by the user is not required, high print quality can be maintained without burdening the user. More particularly, high print quality can be maintained in barcodes and other printouts that require high precision, and a drop in barcode readability can be suppressed.

The correction methods described above can adjust the printing position of individual print elements irrespective of the conveyance distance control pitch of the conveyance motor 5*a*. Shifts in the printing position caused by slipping can therefore be eliminated with good precision, and a drop in print quality can be suppressed.

Variations (1) The correction methods described above use continuous paper as the recording paper P, but the invention can also be used with other types of recording media. For example, the conveyance distance can be corrected in the same way when using label paper having labels made of thermal paper affixed at a constant pitch on the front of a continuous liner with black marks BM indicating the position of each label formed on the back side of the liner. Cut-sheet media of a fixed length can also be used instead of continuous paper as the recording paper P. In this case, slippage L is determined each time one sheet is printed to correct the conveyance distance when printing the next cut sheet. This enables suppressing a drop in print quality when printing on cut-sheet media.

(2) When label paper is used as the recording paper P, a transmissive photosensor can be used instead of a reflective photosensor as the paper detector 9. Because an edge of a label is detected to get the paper feed position and slippage L can be acquired therefrom in this case, black marks BM need not be provided.

(3) The embodiment described above applies the invention to a thermal printer 1, but the invention can also be applied to printers that use an inkjet printhead. In this case, slippage L can be acquired and the conveyance distance can be corrected based on the drive distance of the drive roller of a conveyance roller pair that holds and conveys the recording paper P therebetween at a specific position on the conveyance path A.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control method for a printing device that is connectable to a computer and prints to recording paper by a printhead based on print data received from the computer while conveying the recording paper by a paper feed roller, comprising steps of:

determining slippage between the paper feed roller and the recording paper when conveying the recording paper through a specific print area on the recording paper;

compensating for slippage when conveying the next print area located downstream from the specific print area in the conveyance direction of the recording paper by inserting a non-printing area of a length corresponding to the slippage in white space where printing by the printhead based on the print data does not occur in the next print area; and compensating for slippage when there are multiple white spaces in the next print area by dividing and inserting the non-printing area into a specified number of white spaces.

2. The control method for a printing device described in claim 1, wherein the recording paper is continuous paper having print areas disposed at a constant interval in the conveyance direction, or is label paper having labels defining the print areas affixed at a constant interval in the conveyance direction on a continuous liner, and the control method includes as steps executed when printing to each print area:

detecting a reference position for a print area on the recording paper at a specific position on the conveyance path while conveying the recording paper, and acquiring the rotational distance of the paper feed roller or the drive distance of the paper feed roller drive source during the time between detection of one reference position and detection of the reference position corresponding to the next print area; and calculating the slippage based on the detected rotational distance or drive distance, and the previously stored interval between the print areas.

3. The control method for a printing device described in claim 2, wherein:

the reference position is a mark corresponding to each print area applied to the recording paper, or is a label edge.

4. The control method for a printing device described in claim 1, further comprising steps of:

storing slippage between the paper feed roller and the recording paper in the specific print areas; and inserting a non-printing area of a length corresponding to the stored slippage to compensate for slipping when conveying the next print area.

5. A control method for a printing device that is connectable to a computer and prints to recording paper by a printhead based on print data received from the computer while conveying the recording paper by a paper feed roller, comprising steps of:

determining slippage between the paper feed roller and the recording paper when conveying the recording paper through a specific print area on the recording paper;

compensating for slippage when conveying the next print area located downstream from the specific print area in the conveyance direction of the recording paper by inserting a non-printing area of a length corresponding to the slippage in white space where printing by the printhead based on the print data does not occur in the next print area; and dividing the next print area into plural segments at a specific interval in the conveyance direction of the recording paper;

determining if each divided segment is a white space;

segmenting and inserting the non-printing area to a specific plural number of white spaces or to one specific white space if there are plural white spaces; and inserting the non-printing area to that white space if there is only one white space.

6. The control method for a printing device described in claim 5, further comprising steps of:

determining the insertion length of the non-printing area to the next print area based on the slippage;

calculating a unit insertion length as the insertion length divided by the number of segments in the next print area;

sequentially determining from the end of the next print area on the upstream side in the conveyance direction whether or not each segment is white space; and when a segment is determined to be white space and the non-printing area is segmented and inserted therein, setting the insertion length of the non-printing area to the white space to the unit insertion length if the white space is located at the beginning of the print area or the segment immediately preceding the white space is white space to which the non-printing area is inserted, and setting the insertion length of the non-printing area to the white space to the sum of the unit insertion length plus the product of the unit insertion length times the number of consecutive non-white-space segments immediately preceding the white space segment if the segment immediately preceding the white space is not white space and a non-printing area is not inserted thereto.

7. A control method for a printing device that is connectable to a computer and prints to recording paper by a printhead based on print data received from the computer while conveying the recording paper by a paper feed roller, comprising steps of:

determining slippage between the paper feed roller and the recording paper when conveying the recording paper through a specific print area on the recording paper; and converting coordinates in the conveyance direction based on the slippage when conveying the next print area to a position downstream from the specific print area in the conveyance direction of the recording paper when print objects are placed in the next print area using coordinates based on print data received from the computer; and compensating for slippage when there are multiple white spaces in the next print area by dividing and inserting the non-printing area into a specified number of white spaces.

8. The control method for a printing device described in claim 7, wherein:

the next print area is defined as a page of a specific range, and the coordinates identify a position on the page.

9. A printing device that is connectable to a computer, comprising:

a communication unit that receives print data from the computer;

a recording paper conveyance mechanism including a paper feed roller that conveys recording paper through a conveyance path and a drive source that drives the paper feed roller;

a printhead that prints on the recording paper;

a slippage calculation unit that calculates slippage between the paper feed roller and the recording paper that occurs when conveying the recording paper through a specific print area on the recording paper; and a conveyance distance correction unit that compensates for slippage when conveying the next print area located downstream from the specific print area in the conveyance direction of the recording paper by inserting a non-printing area of a length corresponding to the slippage in white space where printing by the printhead based on the print data does not occur in the next print area, wherein the conveyance distance correction unit compensates for slippage when there are multiple white spaces in the next print area by dividing and inserting the non-printing area into a specified number of white spaces.

10. The printing device described in claim 9, further comprising:

a detector that detects a reference position denoting a print area on the recording paper at a specific position on the conveyance path;

wherein the recording paper is continuous paper having print areas disposed at a constant interval in the conveyance direction, or is label paper having labels defining the print areas affixed at a constant interval in the conveyance direction on a continuous liner;

the detector detects the reference position while the paper feed roller conveys the recording paper when printing to each print area by the printhead; and the slippage calculation unit acquires the rotational distance of the paper feed roller or the drive distance of the paper feed roller drive source from the time when the detector detects the reference position of the specific print area to the time when the detector detects the reference position of the next print area, and calculates the slippage based on the detected rotational distance or drive distance, and the previously stored interval between the print areas.

11. The printing device described in claim 10, wherein:

the reference position is a mark corresponding to each print area applied to the recording paper, or is a label edge.

12. The printing device described in claim 9, further comprising:

a storage unit that stores slippage between the paper feed roller and the recording paper in the specific print areas;

wherein the conveyance distance correction unit inserts a non-printing area of a length corresponding to the slippage stored in the storage unit to compensate for slipping when conveying the next print area.

13. The printing device described in claim 9, wherein:

the printing device includes a storage unit configured to store a print object that is based on print data received from the computer and corresponds to the next print area at a specific position using coordinates.

14. A printing device that is connectable to a computer, comprising:

a communication unit that receives print data from the computer;

a recording paper conveyance mechanism including a paper feed roller that conveys recording paper through a conveyance path and a drive source that drives the paper feed roller;

a printhead that prints on the recording paper; a slippage calculation unit that calculates slippage between the paper feed roller and the recording paper that occurs when conveying the recording paper through a specific print area on the recording paper; and a conveyance distance correction unit that compensates for slippage when conveying the next print area located downstream from the specific print area in the conveyance direction of the recording paper by inserting a non-printing area of a length corresponding to the slippage in white space where printing by the printhead based on the print data does not occur in the next print area, wherein the conveyance distance correction unit divides the next print area into plural segments at a specific interval in the conveyance direction of the recording paper, determines if each divided segment is a white space, segments and inserts the non-printing area to a specific plural number of white spaces or to one specific white space if there are plural white spaces, and inserts the non-printing area to that white space if there is only one white space.

15. The printing device described in claim 14, wherein:

the conveyance distance correction unit determines the insertion length of the non-printing area to the next print area based on the slippage;

calculates a unit insertion length as the insertion length divided by the number of segments in the next print area;

sequentially determines from the end of the next print area on the upstream side in the conveyance direction whether or not each segment is white space; and when a segment is determined to be white space and the non-printing area is segmented and inserted therein, sets the insertion length of the non-printing area to the white space to the unit insertion length if the white space is located at the beginning of the print area or the segment immediately preceding the white space is white space to which the non-printing area is inserted, and sets the insertion length of the non-printing area to the white space to the sum of the unit insertion length plus the product of the unit insertion length times the number of consecutive non-white-space segments immediately preceding the white space segment if the segment immediately preceding the white space is not white space and a non-printing area is not inserted thereto.

* * * * *